United States Patent [19]

Kemper

[11] Patent Number: 4,745,821
[45] Date of Patent: May 24, 1988

[54] SPEED RATIO ADJUSTING SYSTEM FOR NUTATIONAL TRACTION DRIVE TRANSMISSIONS

[75] Inventor: Yves J. Kemper, Bloomfield Hills, Mich.

[73] Assignee: Bloomfield Research Limited Partnership, Troy, Mich.

[21] Appl. No.: 933,508

[22] Filed: Nov. 21, 1986

[51] Int. Cl.$^4$ .............................................. F16H 15/16
[52] U.S. Cl. ...................................... 74/190; 74/191; 74/212
[58] Field of Search ................... 74/193, 191, 190.5, 74/190, 212, 208

[56] References Cited

U.S. PATENT DOCUMENTS

| Re. 29,328 | 8/1977 | Kemper | 74/190 |
| Re. 30,981 | 6/1982 | Kemper | 74/193 |
| 878,609 | 2/1908 | Carman | 74/191 |
| 4,277,982 | 7/1981 | Kemper | 74/191 |
| 4,630,494 | 12/1986 | Kemper | 74/191 |

FOREIGN PATENT DOCUMENTS

| 43163 | 10/1930 | Denmark | 74/193 |
| 260690 | 3/1949 | Switzerland | 74/191 |

Primary Examiner—Leslie A. Braun
Assistant Examiner—Scott Anchell
Attorney, Agent, or Firm—Lyman R. Lyon

[57] ABSTRACT

A system for adjusting the speed ratio of nutational traction drive transmissions in which speed ratio is dependent on the spacing of oppositely convergent cone members rotatably supported on a nutatable axis. The system includes a thread shaft having oppositely pitched threads engaged by carrier nuts in turn fixed to the cone members. Relative rotation of the cone members and the thread shaft is effected by alternately engagable clutch bodies at opposite ends of the thread shaft, the clutch bodies being controlled for relative and opposite rotational direction with respect to the cone members by gear sets linking the cone members and its support.

2 Claims, 3 Drawing Sheets

FIG 1

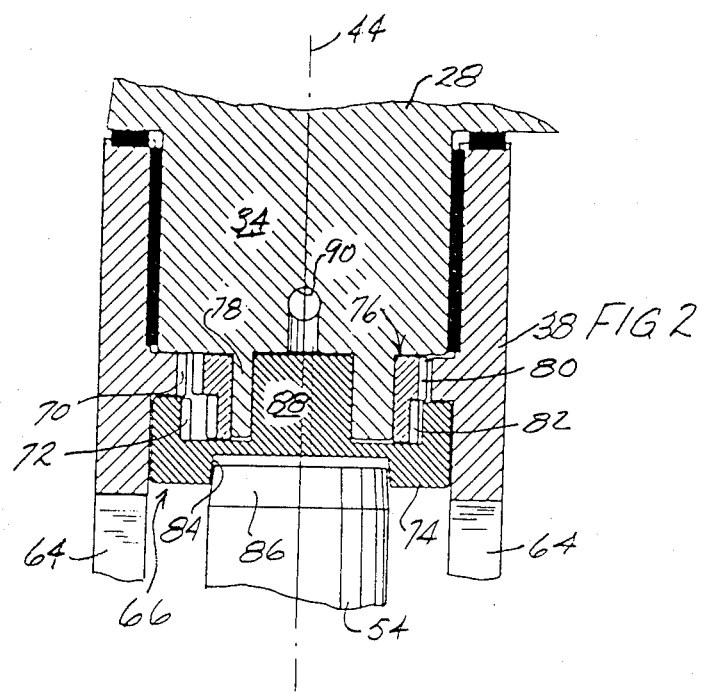
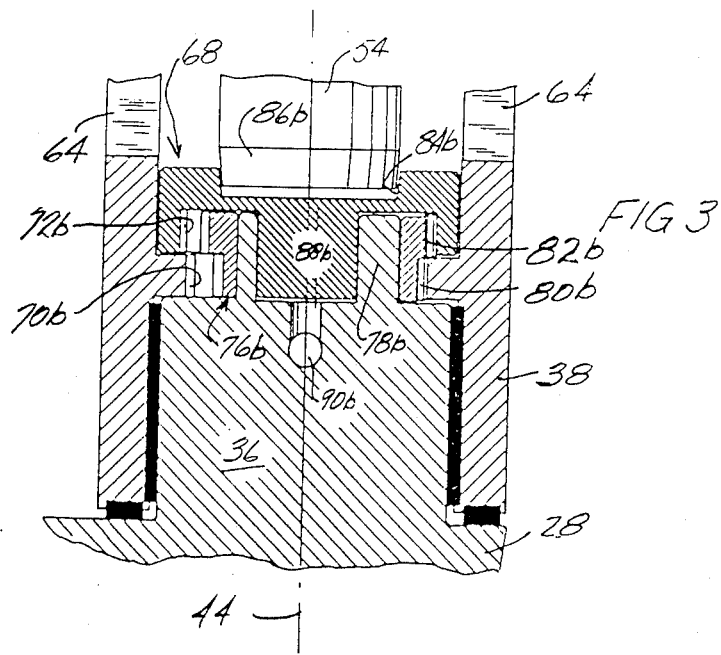

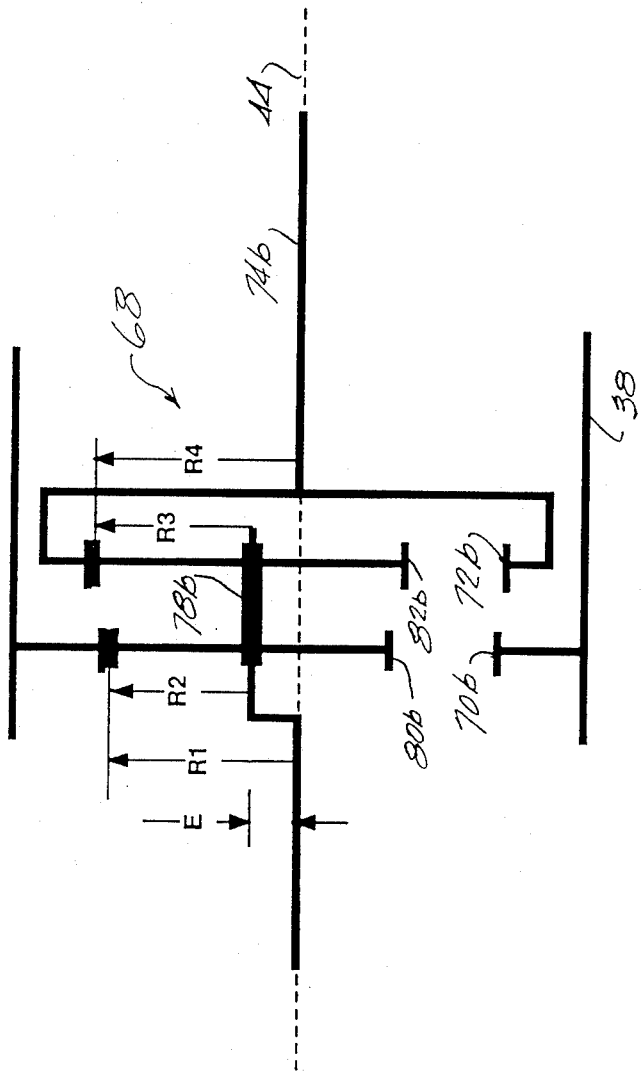

SPEED RATIO ADJUSTING SYSTEM FOR NUTATIONAL TRACTION DRIVE TRANSMISSIONS

BACKGROUND OF THE INVENTION

This invention relates to continuously variable transmissions and more particularly, it concerns a speed ratio adjusting system for such transmissions in which torque is transmitted by friction between two bodies having variable relative radii at two points of rolling friction contact.

The disclosures of U.S. Pat. Nos. Re. 29,328, Re. 30,981 and 4,112,779 contain several embodiments of continuously variable nutational traction drive transmissions in which three frame supported working bodies operate to transmit a mechanical power input to a rotatable output at infinitely variable output/input speed ratios within the design range of the transmission. For purposes of definition in this background discussion as well as in the ensuing detailed description of the present invention and in the appended claims, the three working bodies may be termed, respectively, an "alpha body" which is supported by the transmission frame to be concentric with a first axis, a "beta body" which is supported by the alpha body to be concentric with a second axis inclined with respect to and intersecting the first axis at a point of axes intersection, and an "omega body" carried by the frame to be concentric also with the first axis. Although any one of these three bodies may be rotatable on the respective axes with which they are concentric, one of the three is held against rotation to provide a reaction torque whereas the other two bodies are rotatable and coupled either directly or by gearing to the respective input and output shafting of the transmission. In a preferred mode of operation, power input drives the alpha body in rotation to carry the beta body in rolling frictional engagement with a grounded omega body. Speed ratio adjustment is most commonly though not exclusively adjusted by using a pair of rings as the grounded omega body and shifting the rings along the first transmission axis. In this way the radius ratio of the constant radius rings and the variable radius bioconical beta body may be varied in continuous or stepless fashion.

All embodiments of nutational drive transmissions disclosed in these U.S. patents may be characterized as axially oriented in the sense that the angle between the first and second intersecting axes is a relatively small acute angle so that the first and second axes always lie within the two points rolling friction engagement between the beta and omega bodies. In a more recent development of nutational traction drive transmissions exemplified by the disclosure of U.S. Pat. No. 4,630,494 the angle between the first and second transmission axes is increased so that the points of rolling friction contact lie within the sector subtended by that angle. As a result, the beta body and its axis are supported in a generally radial orientation by the alpha body. Such radially orientated nutational traction drive transmissions exhibit significantly increased speed ratio variation and other geometric characteristics which make them especially desirable for automotive application whereas the prior axially oriented transmissions are more suited to use on heavy equipment.

In the geometry of radially orientated nutational traction drive transmissions, the omega body is again grounded but takes the form of spaced plate or dish-shaped members against which oppositely diverging, generally conical members of the beta body engage at two points of rolling friction contact. In one embodiment of such transmission, the beta body is supported by the alpha body at a fixed angle of intersection with normal forces for rolling friction engagement developed by a ramp system supporting the omega plates against the nutating beta body. Speed ratio variation in this form of transmission is effected by moving the cone members of the beta body inwardly or outwardly along the beta body axis and thus take advantage of the radial variation in both the omega plates and in the beta body cones to attain an expanded range of transmission speed ratios. Heretofore, and as disclosed in the aforementioned allowed patent application, movement of the cones along the beta body axis has been accomplished primarily by hydraulic piston/cylinder units which suffer the disadvantage of being less precise than desirable in controlling movement of the cone members, complicated by sealing requirements and perhaps more importantly, inefficient from the standpoint of energy losses principally in pumping the hydraulic fluid to the pressures required for such control systems.

SUMMARY OF THE INVENTION

In accordance with the present invention, a speed ratio adjusting system is provided for nutational traction drive transmissions particularly though not exclusively suited for use in such transmissions of the radially orientated type in which the two cone members of a biconical beta body are positively and precisely positioned in adjustably spaced relationship on the beta body axis. Yet, the cone members are movable toward and away from each other for transmission speed ratio adjustment by a drive mechanism which is simply constructed and highly efficient from the standpoint of power consumption.

In a preferred embodiment, the cone members of the beta body are axially adjustable with respect to and linked for rotation with a tubular beta body shaft supported at opposite ends by trunnion bearings in the alpha body. Positioned within the tubular beta body shaft is an independently rotatable shaft having oppositely pitched externally threaded sections engaged by internally threaded carrier nuts which extend through radial slots in the tubular shaft and are secured to the cone members. The thread shaft is supported solely by the carrier nut connection with the cone members both axially and radially. At the ends of the inwardly directed alpha body carried trunnion bearings, gear reduction sets are provided on opposite ends of the beta body and operate respectively to rotate the threaded shaft in opposite directions relative to the tubular shaft depending on which of the gear set is coupled, preferably by a friction clutch, to an opposite end, selectively of the thread shaft. The clutch surfaces by which one or the other end of the thread shaft is engaged may be integral with one of the gears of the respective gear sets and actuated by a simple hydraulic piston supplied by hydraulic fluid through the alpha body.

Accordingly, a principal object of the present invention is to provide a speed ratio adjusting mechanism for nutational traction drive transmissions which is easily constructed, high effective in operation, and capable of providing precise control over the positioning of nutating transmission components. Other objects and further scope of applicability of the present invention will become apparent from the detailed description to follow taken in conjunction with the accompanying drawings in which like parts are designated by like reference numerals.

BRIEF DESCRIPTION OF THE DRAWING

FIG. 1 is a radial cross section on the two principal axes of a radially oriented traction drive transmission incorporating the present invention;

FIG. 2 is an enlarged fragmentary cross section at one end of the nutatable member of the transmission shown in FIG. 1;

FIG. 3 is a similar enlarged fragmentary cross section at the end of the same nutatable body opposite from the end thereof illustrated in FIG. 2; and FIG. 4 is a schematic representation of the gearing shown in FIG. 3.

DETAILED DESCRIPTION OF THE PREFERRED ENBODIMENT

Figure 1:
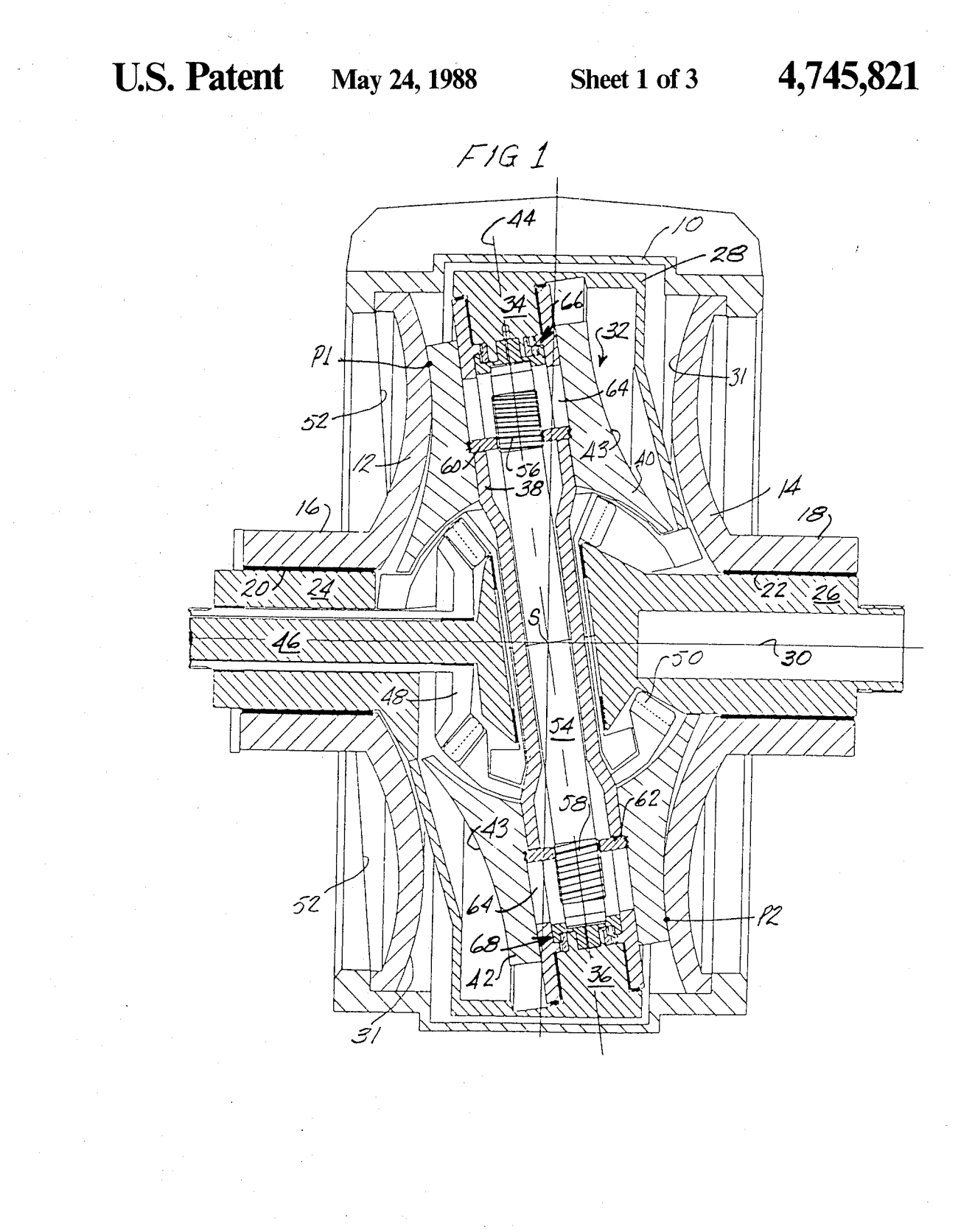

In FIG. 1 of the accompanying drawings, the major components of a nutational traction drive transmission are illustrated for that class of such transmission disclosed in U.S. Pat. No. 4,630,494. The disclosure of this U.S. patent is expressly incorporated herein by reference to the extent that it is needed for a full understanding of the nutational traction drive transmission in which the present invention is used.

The illustrated transmission embodiment includes a frame 10 from which a pair of omega plates 12 and 14 are peripherally supported. The omega plates, in turn, are provided with integral hubs 16 and 18 having internal bearings 20 and 22 for supporting shaft extensions 24 and 26 of an alpha body 28. The omega plates 12 and 14 as well as the alpha body 28 are therefore concentric with a first transmission axis 30. The omega plates 12 and 14 are grounded against rotation with respect to the frame 10 and define traction surfaces 31 of revolution about the axis 30. The alpha body 28, on the other hand, is freely rotatable about the axis 30 and thus may be driven by a power input (not shown) capable of delivering torque to the shaft extension 26.

A beta body, generally designated by the reference numeral 32, is supported at its ends by inwardly directed trunnion shafts 34 and 36 journalled in axial bores at opposite ends of a tubular or hollow shaft 38. The tubular shaft 38, in turn, supports a pair of cone members 40 and 42 to establish oppositely convergent, generally conical traction surfaces 43 of revolution about a second axis 44 which intersects the first axis 30 at a point S of axes intersection. As thus supported by the alpha body 28, the beta body 32 is concentric with the second axis 44 and the conical traction surfaces 43 on the cone members 40 and 42 thereof engage the traction surfaces 31 on the omega plates 12 and 14 at two points P1 and P2 of rolling friction contact. In the particular transmission embodiment illustrated, the angle at which the axes 30 and 44 intersect is preestablished or fixed. Adjustment of the transmission to attain variable speed ratios is by axial movement of the cone members 40 and 42 on the central shaft 38 and an attendant sliding movement of one or both of the omega plates 12 and 14 along the first axis 30 to shift the points P1 and P2 of contact between the cones 40 and 42 and the omega plates 12 and 14 inwardly and outwardly as is described fully in the aforementioned U.S. Pat. No. 4,630,494 and particularly with respect to the embodiment of FIG. 1 in that Patent. Variable speed output of the transmission, also as described in the aforementioned Patent is through an output shaft 46 linked to the beta body 32 by gears 48 and 50 keyed to the output shaft 46 and to the tubular beta body shaft 38, respectively.

In the operation of the transmission with a power input to the alpha body 28, rotation of the output shaft 46 is a function of both rotation of the alpha body 28 about the axis 30 and of rotation of the beta body 32 about its axis 44. The speed at which the beta body rotates about its axis 44 is dependent on a position of the contact points P1 and P2 and the relative radial distances of those contact points along the omega plates 12 and 14 from the first axes 30 and as a radius of the cones 40 and 42 from the beta body axis 44.

In a transmission like the illustrated embodiment where the angle at which the beta body 32 is supported from the alpha body 28 is fixed, normal force for assuring a rolling friction drive between the beta body cones 40 and the omega plates 12 and 14 is effected by supporting at least one of the omega plates, in this instance, the plate 12 from the frame 10 through a system of ramps which, as taught in U.S. Pat. No. 4630,494, may be ball-form ramps but in the illustrated embodiment are complementary inclined ramps bearing against each other on helical surfaces designated in FIG. 1 by the reference numeral 52. Thus, rotation of omega plate 12 relative to the frame 10 will effect movement of the omega plate 12 along the axis 30. The bearings 20 and 22 supporting the alpha body and thus the beta body in relation to the plates allow axial centering of the beta body between the two plates 12 and 14 so that only one of the two plates need be so equipped with energizing ramps.

In accordance with the present invention, adjustment of the beta body cones 40 and 42 toward and away from the point S of axes intersection and along the second axis 44 is effected by a thread shaft 54 located within the tubular shaft 38. The thread shaft 54 is provided with external threaded sections 56 and 58. The threaded sections 56 and 58 are oppositely pitched and engaged by carrier nut members 60 and 62, respectively. The members 60 and 62 extend through slots 64 in the tubular shaft 38 to be secured, such as by welding, to the beta body cones 40 and 42. Though positioned concentrically within the tubular shaft 38, the thread shaft 54 is not supported in any way directly from the tubular shaft 38 but instead is supported radially by connection only to the cone members 40 and axially from the carrier nut members 60 and 62. In this latter connection, it is to be noted that the threaded sections 56 and 58 are of a sufficiently shallow pitch that axial forces on the carrier nut members 60 and 62 will not cause rotation of the thread shaft 54.

Opposite ends of the thread shaft 54 are arranged to be coupled with the alpha body bearing trunnions 36 and 34 through gear sets designated generally by the reference numerals 66 and 68 in FIG. 1 and which are illustrated more clearly in FIGS. 2 and 3 in the drawings, respectively. As shown in FIG. 2, the gear set 66 includes an internal ring gear 70 integral with or otherwise secured to the tubular beta body shaft 38, and an internal ring gear 72 formed on a clutch body 74 journalled in the alpha body trunnion 34 to be concentric with the beta body axis 44. The ring gears 70 and 72 are interconnected by a stepped pinion gear 76 journalled from a shaft extension 78 of the trunnion 34 which is eccentric with respect to the beta body axis 44. It is to be noted that in the gear set 66 located at one end of the thread shaft 54, a gear section 80 of the stepped gear 76 in mesh with the beta shaft carried gear 70 is larger in radius than a companion gear section 82 in mesh with the clutch body gear 72.

The clutch body 74 is provided with an internal conical friction face 84 which is adapted to engage a tapered surface 86 on the end of the shaft 54 illustrated in FIG. 2. In this respect, the clutch body 74 includes a central hub 88, which though rotatable in the eccentric extension 78 of the trunnion 34, acts as a piston by which the body 74 is forcibly displaced along the axis 44 and into coupling engagement with the tapered surface 86 by hydraulic fluid supplied though a port 90 in the trunnion 34. In this way, the body 74 and the tread shaft 54 may be disengaged or rotatably coupled by a hydraulic control system (not shown).

At the other end of the shaft 54, components corresponding to those identified in FIG. 2 are identified by the same reference numerals but with a "b" suffix. While the parts at the end of the shaft illustrated in FIG. 3 generally correspond in function to those described with reference to FIG. 2, it is to be noted that the gear sections of the stepped gear 76b are the reverse of the stepped gear 76 at the opposite end of the shaft 54. In other words, the gear section 80b in mesh with the tubular shaft carried ring gear 70b is of a radius smaller than the radius of the gear section 82b in mesh with the gear 72b on the clutch body 74b. This radius orientation of the gear sections 80b and 82b is the reverse of the corresponding gears 80 and 82 shown in FIG. 2 for reasons which will become apparent from the ensuing mathematical explanation of the gear sets 66 and 68.

An understanding of the gear sets 66 and 68 and the operation thereof may be had by reference to FIG. 4 of the drawings in which the components of the gear set 68 are schematically represented. As thus shown in FIG. 4, the radius of the tubular shaft connected gear 70b is R1; the radius of the gear section 80b in mesh with the ring gear 70b is R2; the radius of the gear section 82b is R3 and the radius of the ring gear 72b on the clutch body 74b is R4. The output/input speed reduction ratio of this form of gearing is a function of the respective radii of the four gears in accordance with the relationship, $1-[(R2\times R4)/(R1\times R3)]$. Given the geometry of the gear sets 66 and 68 as illustrated in FIGS. 3 and 4, it will be noted that the functions $(R2\times R4)$ and $(R1\times R3)$ in the relationship will differ only slightly in value so that the quotient of the two functions will approach unity but may be greater or less than 1. From the relationship, it will be seen that when the function $(R2\times R4)$ is greater than the function $(R1\times R3)$, as it is in the gear set 66, the output at the clutch body 74b is both greatly reduced and may be characterized as being in a (−) direction. On the other hand, where the function $(R2\times R4)$ is less than the function $(R1\times R3)$, as it is in the gear set 68 represented in FIG. 4, then the ratio is of opposite sign or (+), still greatly reduced, but in a reverse direction.

From the foregoing, it will be appreciated by reference again to FIGS. 1–3 of the drawings that when the clutch body 74 of the gear set 66 is coupled with the shaft 54, the thread shaft will rotate in one direction relative to the tubular shaft 38, causing axial movement of the cones 40 and 42 toward each other, for example, whereas engagement of the shaft 54 by the clutch body 72b at the opposite end will cause the thread shaft 54 to rotate in the opposite direction relative to the tubular shaft 38 and cause the cones 40 and 42 to be moved away from each other. In this way and with the appropriate hydraulic control for energizing the clutch bodies 74 and 74b, it will be seen that the cones 40 and 42 on the beta body 32 may be shifted axially to vary the speed ratio of the illustrated transmission embodiment. Moreover, the power needed to drive the cone shifting movement is supplied by transmission input power directly from the alpha body 28 and resulting rotation of the beta body 32, through the gear sets 66 and 68, the thread shaft 54 and the carrier nuts 60 and 62 to the cone members 40 and 42.

Thus it will be appreciated that as a result of the present invention, highly effective speed ratio adjusting mechanism for nutational traction drive transmissions is provided by which the principal objective, among others, are completely fulfilled. It is contemplated that substantial modifications and/or changes may be made in the embodiment disclosed herein without departure from the invention. Accordingly, it is expressly intended that the foregoing description and accompanying drawing are illustrative only, not limiting, and that the true spirit and scope of the present invention be determined by reference to the appended claims.

I claim:

1. In a traction drive transmission comprising a support body defining a first axis, a shaft assembly supported by said support body for rotation on a second axis intersecting said first axis, and a pair of spaced traction discs having traction surfaces extending radially from said first axis, said support body, said shaft assembly and said traction discs being rotatable relative to one another, said shaft assembly comprising a central tubular shaft concentric with said second axis, and pair of oppositely divergent cone members rotatable with and movable axially on said shaft, said cone members being in rolling friction engagement with the traction surfaces on said traction discs at two points of contact spaced oppositely from the point of intersection of said first and second axes, the improvement comprising:

a thread shaft positioned within said tubular shaft and having a pair of oppositely pitched external thread sections spaced longitudinally thereon:

a carrier nut member threaded one each of said thread sections, said carrier nut members extending radially through said tubular shaft and being fixed to said cone members, respectively; and means for coupling said thread shaft to said support body to effect relative rotation of said thread shaft, thereby to control axial movement of said cone members along said second axis.

2. The transmission recited in claim 1 wherein said means for coupling said thread shaft to said support member includes alternately engagable clutch bodies at opposite ends of said thread shaft and means for driving said clutch bodies in relative directions with respect to said tubular shaft.

* * * * *